United States Patent [19]

Looney

[11] Patent Number: 4,750,727
[45] Date of Patent: Jun. 14, 1988

[54] AUTOMATIC DOCUMENT FEEDER FOR COPIERS

[75] Inventor: John H. Looney, Fairport, N.Y.

[73] Assignee: Xerox Corporation, Stamford, Conn.

[21] Appl. No.: 55,081

[22] Filed: May 28, 1987

[51] Int. Cl.$^4$ .............................................. B65H 7/04
[52] U.S. Cl. .................................... 271/110; 271/120; 271/127
[58] Field of Search .............. 271/110, 119, 120, 126, 271/127

[56] References Cited

U.S. PATENT DOCUMENTS

| | | | |
|---|---|---|---|
| 3,747,918 | 7/1973 | Margulis et al. | 271/4 |
| 4,346,878 | 8/1982 | Aizawa | 271/118 |
| 4,372,547 | 2/1983 | Yanagawa et al. | 271/10 |
| 4,381,860 | 5/1983 | Silverberg | 271/10 |
| 4,475,733 | 10/1984 | Benson | 271/120 |
| 4,496,144 | 1/1985 | Perun | 271/120 |
| 4,506,877 | 3/1985 | Sagiv | 271/127 |
| 4,515,357 | 5/1985 | Hamlin | 271/120 |
| 4,516,764 | 5/1985 | Tamura | 271/34 |
| 4,535,982 | 8/1985 | Mochimaru | 271/127 |
| 4,561,644 | 12/1985 | Clausing | 271/34 |
| 4,638,988 | 1/1987 | Kershaw | 271/171 |
| 4,640,504 | 2/1987 | Garavuso et al. | 271/113 |

Primary Examiner—Richard A. Schacher

[57] ABSTRACT

A sheet feeder for a copier for the sequential separation and feeding of individual sheets from a stack of sheets with an impact type sheet feeder with flexible frictional flapper blades, a preprogrammed drive for automatically moving the sheet stacking tray towards or away from the sheet feeder, a reference stop automatically limiting the movement of the top of the stack relative to the feeder, and a programmed positioning mode for automatically slightly lowering the tray into an optimum feeding position in which the top of the stack is maintained at a substantially constant level position relative to the feeder, closely adjacent, but slightly spaced below, the limit position, and automatically programmed repositioning to maintain the optimum feeding position and to compensate for the reduction in the height of the stack as sheets are fed, and to provide improved double sheet feed prevention by cycling the tray through small up and down movements coordinated with the feeding of sheets from the stack, for moving the fed sheet into and out of engagement with retard members. Retarding is further assisted by angled take-way rollers deflecting the trail end of the fed sheet down against the next sheet.

15 Claims, 4 Drawing Sheets

AUTOMATIC DOCUMENT FEEDER FOR COPIERS

Cross-reference is made to a copending application Ser. No. 055,082 of even date by the same inventor and assignee entitled "Automatic Document Feeder/Separator For Copiers".

The invention relates to copier sheet handling, and, more particularly, to low cost automatic sequential document feeding for presentation to a copier of individual document sheets to be copied, or to sequential feeding of individual copy sheets from a shank. It has particular application to the improvement of low cost impact type sheet separating and feeding reliability.

A particularly desirable feeder for copy sheets or original documents for a copier is a very low cost and lightweight system utilizing a so-called frictional impact (paddle wheel) type feeder. A particularly desirable such feeder is known to be one utilizing flexible elastomeric frictional flapper blades which slightly deform to frictionally engage the upper surface or top sheet of a stack of sheets, repeatedly impacting and pulling the top sheet away from the rest of the stack, to separate and feed out the sheets sequentially from the stack. A preferred form thereof is the planar or two-bladed type, especially the semi-circular bladed paddle wheels shown in FIGS. 3–4 of U.S. Pat. No. 4,640,504 issued Feb. 3, 1987 to G. M. Garavuso, et al, corresponding to the feeder blades shown in FIGS. 4 and 5 herein. This type of feeder has been successfully utilized in commercial products, including the Xerox Corporation "1065" copier automatic document feeder (ADF). As shown, for example, in FIGS. 3–8 of U.S. Pat. No. 4,638,988 issued Jan. 27, 1987 to I. G. Kershaw, preferably a plurality of such paddle wheel feeder blade units are commonly mounted in one plane on a single driven shaft, and rotated together for sheet separating and feeding from a stack. The intermittent action of such a two-bladed paddle wheel and the very flexible tips thereof reduces the tendency to overdrive the sheets or put excessive normal force on the sheets.

As also noted in U.S. Pat. No. 4,381,860 issued May 3, 1983 to Silverberg, the flapper blade feeder may be utilized together with an uphill ramp for feedoff. As also shown in the references, the sheets sequentially fed off the stack by the flapper feeder are preferably conventionally acquired by the nips of downstream conventional sheet feeding rollers ("take-away" rolls) for feeding the sheets away from the stack once they have been initially fed off of the stack by the flappers.

Such flapper/feeders provide simple and low cost feeding, and also improved separation due to the repeated impacting or striking of the blades by the intermittent contact of the paddle or blade tips against the top of the stack. This helps overcome the serious problem of plural or "double-sheet" feeding, i.e. incomplete separation of the sheets being fed rather than the one-at-a-time feeding required for both copying and document feeding. A known advantage of a planar or two-bladed flapper system is that the flapper drive may be stopped or "parked" in a horizontal position, with the blades parallel to and substantially spaced from the stack, so that the stack may be loaded under the flappers. Then, when the flapper drive shaft is rotated, the blades will make an interference engagement with the top of the stack during a portion of the arc of rotation of the tips of the flappers. The ability to "park" the blades parallel to the stack, out of contact with the stack, also enables the decoupling of the paddle feeder from the departing or previously initially fed sheet, thus allowing it to be stopped, yet avoiding any resistance to the final take-away of the sheet by the downstream take-away rollers.

However, a particular sensitivity or criticality of this type of feeder is the need to closely control the degree of paddle contact or interference between the paddle and the top sheet of the stack to be fed. If there is insufficient interference or contact, nothing will be fed. If there is too much contact, there will be a tendency for a plural sheet feeding, and it is undesirable to use the expensive, complex, friction sheet retard separation systems or corrugating vacuum and/or air knife sheet separating systems characteristic of more expensive and complex sheet feeders. That is, an expansive sheet retard mechanism to prevent double feeding is undesirable and counter productive of the use of a simple low-cost paddle wheel feeding system. An example of such a much more complex retard separation system is that utilized in the Xerox Corporation "1075" copier sheet feeder, as shown for examaple, in U.S. Pat. No. 4,561,644 issued Dec. 31, 1985 to Don P. Clausing. That patent is also cited herein for its suggestions of elements of the present system, but is obviously for, and with, a much more complex and expensive feeding system. Furthermore, sheet retard separator systems of this latter type, wherein relatively high and continuous retarding forces are exerted on the sheets, are disadvantageous for original document feeding due to tendencies to smear inked or other images on the sheet surfaces.

The system disclosed herein provides automatic compensation and control of the range of interference between the frictional impact flapper feeder and the top of the stack to be fed from. There is also automatic compensation for the actual stack height, including automatic compensation for the reduction in stack height from the feeding of previous sheets from the stack. With the present system the slapper feeder is automatically maintained at an optimum feeding distance from the top sheet of the stack, for optimum, light, relatively small arc contact, sufficient to feed the top sheet away from the stack but not so as to bear down hard enough to double feed the underlying sheet. This optimum spacing or range of interference is automatically maintained, irrespective of the original thickness of the stack, or the thickness of the individual sheets, or the number of sheets which have been fed. Yet this is accomplished with a very simple, reliable, and low-cost mechanism and process.

This process may utilize predetermined spacings from a simple fixed stop position for the top of the stack relative to the frictional impact feeder, or may set an optimum paddle feeder interference spacing based upon actual feeding success, i.e., a feedback system, or combinations thereof, as further described in the specific examples herein.

An additional feature of the embodiments disclosed herein relates to automatic means for providing, and increasing and/or cyclically applying, frictional retard forces to an underlying sheet to prevent double feeding with a very simple retard separator mechanism, utilizing the same basic repositioning or distance optimizing system as is utilized for feeding optimization.

Some examples of other, less effective, means for adjusting the spacing between a flapper feeder of this type and the uppermost document are illustrated in Japanese Application No. 60-250924, filed Nov. 11, 1985.

The following references are cited with regard to the general concept of a stack feeder for a copier in which either the paper stack is moved upwards towards the document feeder or the document feeder is moved downwards toward the stack, which may or may not not include a sensor for sensing when the top sheet has been fed successfully through the sheet take-away path and sending a signamoving the sheet stack tray or feeder: said U.S. Pat. No. 4,561,644 to Clausing noted above; and U.S. Pats. Nos. 4,346,878 issued Aug. 31, 1982 to M. Aizawa; 4,506,877 issued Mar. 26, 1985 to O. Sagiv; 4,516,764 issued May 14, 1985 to T. Tamura; and 4,535,982 issued Aug. 20, 1985 to H. Mochimaru. Electrical switch controlled copy sheet stack height elevators are, or course, well known for copiers.

As to the disclosed feature of take-away rollers with a feeding nip forming an upward angle or tilted to the plane of the top of the stack, and/or above the level of the stack, the following patents were noted: U.S. Pat. Nos. 3,747,918 to Margulis et al; 3,905,697 to Komori et al; 4,164,649 to Anderegg et al; 4,354,759 to Bujese; and 4,372,547 to Yanagawa et al.

The previously cited U.S. Pat. No. 4,638,988 to Kershaw is also of interest for its disclosure (see esp. FIG. 9, inter alia) of stack side guides which are adjustable for different sizes of sheets in a transverse dimension, and which guides automatically back off by a small mechanically predetermined small distance away from the edge of the stack after they are initially manually repositioned.

As xerographic and other copiers increase in speed, and become more automatic, it is increasingly important to provide higher speed yet more reliable and more automatic handling of the document sheets being copied, i.e. the input to the copier. It is desirable to feed, accurately register, and copy document sheets of a variety or mixture of sizes, types, weights, materials, conditions and susceptibility to damage, yet with minimal document jamming, wear or damage by the document trasporting and registration apparatus, even if the same documents are automatically fed and registered repeatedly, as for recirculating document precollation copying.

Even with smaller and slower copiers, it has become increasingly desirable to provide a low cost, compact automatic document handler or feeder (ADH or ADF) for automatic feeding of documents from a stack of documents.

Both for document and copy sheet feeding, reliable feeding of only one sheet at time, on demand, requires reliable separation and feeding of one sheet at a time from a stack thereof, with means to prevent both "double feed" and "misfeeds". These requirements are often conflicting.

A preferable document handling system is one that utilizes an existing or generally conventional copier optical imaging system, including the external transparent copying window (known as the platen or imaging station) of the copier. It is also desirable that the document handling system be readily removable, as by pivoting away, to alternatively allow the copier operator to conventionally manually place documents, including books, on the same copying platen. Thus, a lighter weight document handler is very desirable.

Although faster, more accurate, and automatic feeding of each document to the platen to be copied is highly desired, this is difficult to accomplish without skewing (rotating) the document and/or damaging the document. One problem is that documents can vary widely in sheet size, weight, thickness, material, condition, humidity, age, etc.. Documents may even have curls, wrinkles, tears, "dog-ears", cut-outs, overlays, tape, pasteups, punched holes, staples, adhesive or slippery areas, or other irregularities. Unlike sets of copy sheets, which generally are all from the same new clean batches and therefore of almost exactly the same condition and size, documents often vary considerably even if they are all of the same "standard" size, (e.g. letter size, legal size, A4, B4, etc.). In contrast, different documents may be intermixed, and even similar documents in the same set may have come from different paper batches or have variably changed size with different age or humidity conditions, etc.. Furthermore, the images on documents and their fusing can change the sheet feeding characteristics and these images may be subject to damage in feeding if not properly handled, e.g. smearing of fresh typewriting ink. Yet it is desirable to automatically or semiautomatically rapidly feed, register and copy even a mixture of sizes, types, and conditions of documents without document jams or document damage and with each document correctly and accurately aligned to a desired registration position.

Copy sheet feeding has special feeding difficulties also. The sheet cutting process tends to "edge-weld" the edges of the fresh copy sheets together, resisting separation and tending to cause "double" or plural feeds of two ormore sheets at once. These can cause jams in the copy sheet processing stations inside the copier, as well as miscounts and missorts (collation errors).

The present invention overcomes various of the above-discussed problems for copiers, and provides various of the above features and advantages.

A feature of the specific embodiment disclosed herein is to provide a method and apparatus for an improved low cost automatic document handling system for a copier for the sequential separation and feeding of individual sheets sequentially from a stack of sheets on a sheet stacking tray by means of an impact type sheet feeder in which the sheet on the top of the stack to be fed is repeatedly impacted by overlying driven flexible frictional flapper blades which engage and flex against the top sheet during impact therewith and feed the top sheet forward away from the stack; the improvement comprising:

repositioning means for automatically moving, towards or away from one another, one end of said sheet stacking tray with the stack of sheets thereon relative to said impact sheet feeder;

reference stop means for automatically limiting said movement of said sheet stacking tray towards said impact sheet feeder by said stack repositioning means to an initial stopping position of the top of the stack relative to said impact sheet feeder;

said reference stop means comprising a fixed mechanical stop positioned to engage the top of the stack and physically prevent the movement of the top of said stack by said repositioning means any closer to said impact sheet feeder than said initial stopping position;

said stack repositioning means further including automatic reset means for automatically moving the stack in the opposite direction, away from said impact sheet feeder, and out of engagement with said reference stop means, by a small controlled movement distance into an optimum feeding position corresponding to a desired, preset amount of said engagement of said flexible frictional flapper blades against the top sheet of the stack, after said initial stopping position has been set by said reference stop means;

sheet feeding sensor means for detecting and providing signals as to whether a sheet has been successfully fed from said stack by said impact sheet feeder;

said stack repositioning means including means for automatically repeating said movement of the stack relative to said impact sheet feeder in response to said signals from said sheet feeding sensor means to reset said optimum feeding position in response to whether or not said impact sheet feeder is feeding sheets from the stack or to compensate for the reduction in the height of the stack as sheets are fed therefrom.

Further features provided by the system disclosed herein, individually or in combination, include:

means for automatically repeating said movement of the stack relative to said impact sheet feeder with said stack repositioning means is actuated each time the feeding of a sheet is signaled by said sheet feeding sensor means, to automatically reset said optimum feeding position after each sheet feed;

wherein each time said stack repositioning means is actuated it cycles through a movement into said initial stopping position and then a reverse movement into said optimum feeding position, during which said impact type sheet feeder is not actuated;

wherein each time said stack repositioning means is actuated by the feeding of a sheet signaled by said sheet feeding sensor means it cycles through a variable movement driving said sheet stacking tray up into said initial stopping position determined by said engagement of said fixed mechanical stop with the top of the stack, and then a fixed distance reverse movement down into said optimum feeding position, and said impact type sheet feeder is not actuated until after said optimum feeding position is reached;

wherein said stack repositioning means comprises a stepper motor drive and a programmable control means having a preprogrammed drive of said stepper motor;

wherein said stack repositioning means, including said automatic reset means and said means for automatically repeating said movement of the stack, comprises a stepper motor drive and a programmable control means with programmed drive of said stepper motor in response to said sheet feeding sensor means;

wherein said stack repositioning means comprises a stepper motor drive, which is stallable by said engagement of said fixed mechanical stop with the top of the stack, and a programmable control means providing a programmed forward drive of said stepper motor until said stall is reached and then a reverse drive of said stepper motor by a small preset number of steps of said stepper motor in response to said stalling of said stepper motor to provide said automatic reset means;

wherein, while said stack repositioning means is initially actuated to move the top of the stack towards said initial stopping position, said impact type sheet feeder is also actuated, and if and when the feeding of a sheet thereby is signaled by said sheet feeding sensor means during said initial movement, said stack repositioning means is automatically reversed before reaching said initial stopping position and driven by a small preset reverse movement distance to set said optimum feeding position;

wherein said initial movement towards said initial stopping position is reactuated automatically in response to the non-feeding of a sheet signaled by said sheet feeding sensor means after a predetermined time period;

wherein said means for automatically repeating said movement of the stack relative to said impact sheet feeder with said stack repositioning means towards said initial stopping position is actuated each time the feeding of a sheet is signaled by said sheet feeding sensor means, to automatically reset said optimum feeding position after each sheet feed;

wherein said reference stop means automatically limits said movement of said sheet stacking tray towards said impact sheet feeder by said stack repositioning means to a maximum limit position of the top of the stack relative to said impact sheet feeder, and said stack repositioning means automatic reset means automatically repositions said sheet stacking tray with the stack of sheets thereon to maintain said optimum feeding position, in which optimum feeding position the top of the stack of sheets is maintained at a substantially constant level position relative to said impact sheet feeder which is closely adjacent said maximum limit position of the top of the stack, and said stack repositioning means automatically repositions said sheet stacking tray to maintain said optimum feeding position of the top of the stack to compensate for the reduction in the height of the stack as sheets are fed therefrom;

wherein said stack repositioning means comprises a stepper motor drive and a programmable control means having a preprogrammed drive of said stepper motor;

wherein said preprogrammed drive of said stepper motor includes a stack repositioning programmed drive actuated in response to said sheet feeding sensor means;

wherein said preprogrammed drive of said stepper motor includes a stack repositioning programmed drive actuated in response to said reference stop means;

repositioning means comprising preprogrammed drive means for automatically moving said sheet stacking tray with the stack of sheets thereon and said impact sheet feeder towards or away from one another;

reference stop means for automatically limiting said movement of said sheet stacking tray towards said impact sheet feeder by said stack repositioning means to a maximum limit position of the top of the stack relative to said impact sheet feeder;

said stack repositioning means having a first programmed positioning mode for automatically repositioning said sheet stacking tray with the stack of sheets thereon into said maximum limit position of the top of the stack;

said stack repositioning means having a second programmed positioning mode for automatically slightly lowering said sheet stacking tray with the stack of sheets thereon into an optimum feeding position, in which optimum feeding position the top of the stack of sheets is maintained at a substantially constant level position relative to said impact sheet feeder, which optimum feeding position is closely adjacent, but slightly spaced below, said maximum limit position of the top of the stack;

and said stack repositioning means having an optimum feeding positioning mode for automatically repositioning said sheet stacking tray as sheets are fed from the stack to maintain said optimum feeding position of the top of the stack and to automatically compensate for the reduction in the height of the stack as sheets are fed therefrom by cycling said sheet stacking tray with said stack repositioning means though small up and then down movements coordinated with the feeding of sheets from the stack.

Some examples of various other prior art copiers with document handlers, and especially with control systems therefor, including document sheet detecting switches, etc., are disclosed in U.S. Pat. Nos.: 4,054,380; 4,062,061; 4,076,408; 4,078,787; 4,099,860; 4,125,325; 4,132,401; 4,144,550; 4,158,500; 4,176,945; 4,179,215; 4,229,101; 4,278,344; 4,284,270; 4,475,156; 4,485,949; and 4,579,444. It is well known in this art, and in general how to program and execute document handler and copier control functions and logic with conventional or simple software instructions for conventional microprocessors. This is taught by the above and other patents and various commercial copiers. Such software may vary depending on the particular function and particular microprocessor or microcomputer system utilized, of course, but will be available to or readily programmable by those skilled in the applicable arts without experimentation from either descriptions or prior knowledge of the desired functions together with general knowledge in the general software and computer arts. It is also known that conventional or specified document handling functions and controls may be alternatively conventionally provided utilizing various other known or suitable logic or switching systems.

All references cited in this specification, and their references, are incorporated by reference herein where appropriate for appropriate teachings of additional or alternative details, features, and/or technical background.

Various of the above-mentioned and further features and advantages will be apparent from the specific apparatus and its operation described in the example below. The present invention will be better understood by reference to this description of this embodiment thereof, including the drawing figures (approximately to scale), wherein.

Figure 1:
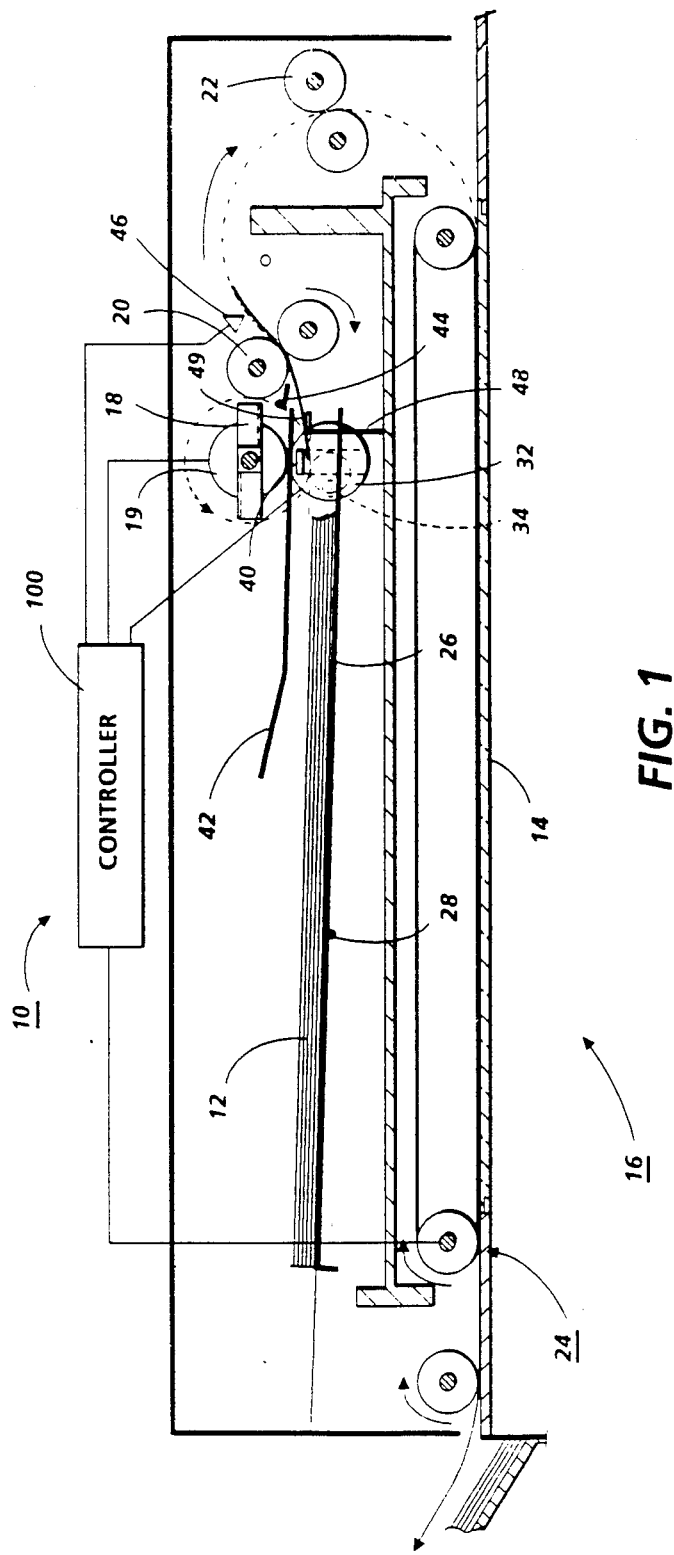
FIG. 1 is a side view of a sheet feeder for a copier, incorporating the system of the invention, shown being used as an exemplary document handler (ADF) for a conventional copier.
Figure 2:
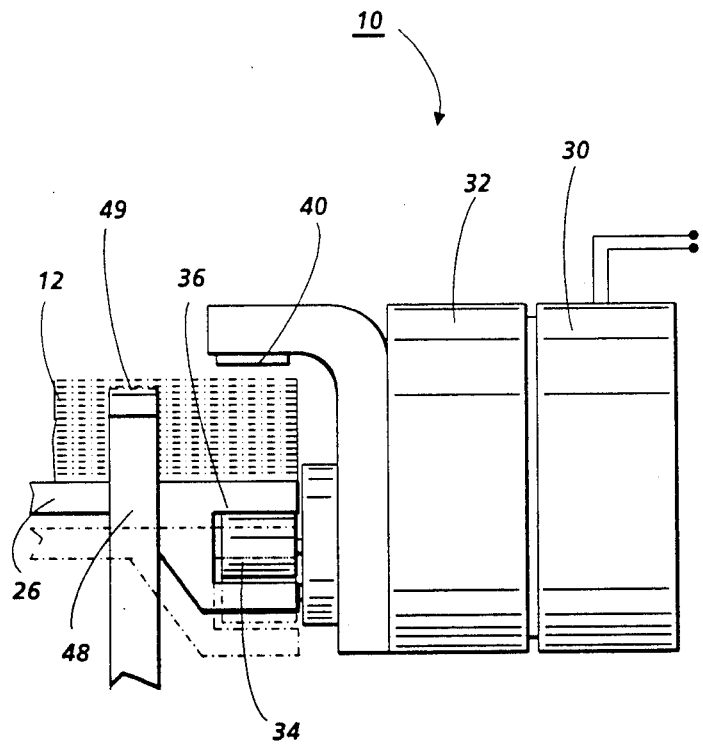
FIG. 2 is an enlarged partial downstream (feed-out) end view of the sheet feeder of FIG. 1.
Figure 3:
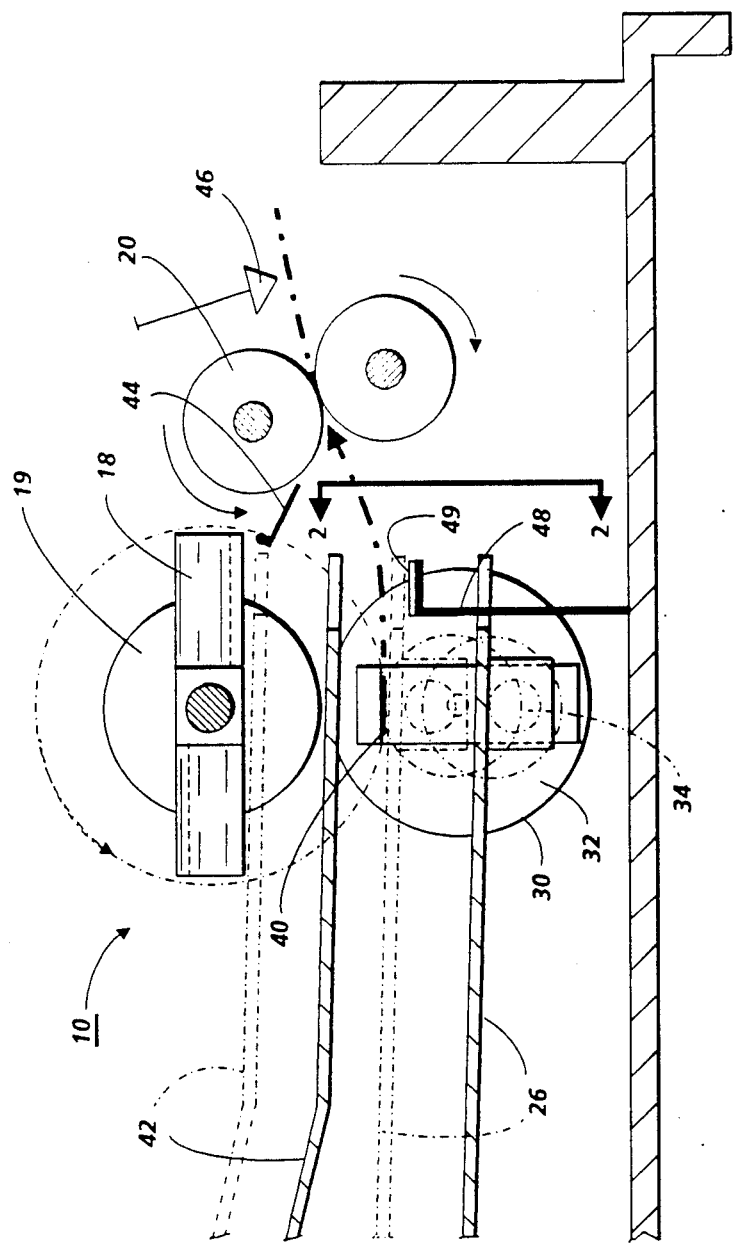
FIG. 3 is an enlarged side view of the initial feeding and operating area of the sheet feeder of FIGS. 1 and 2.
Figure 5:
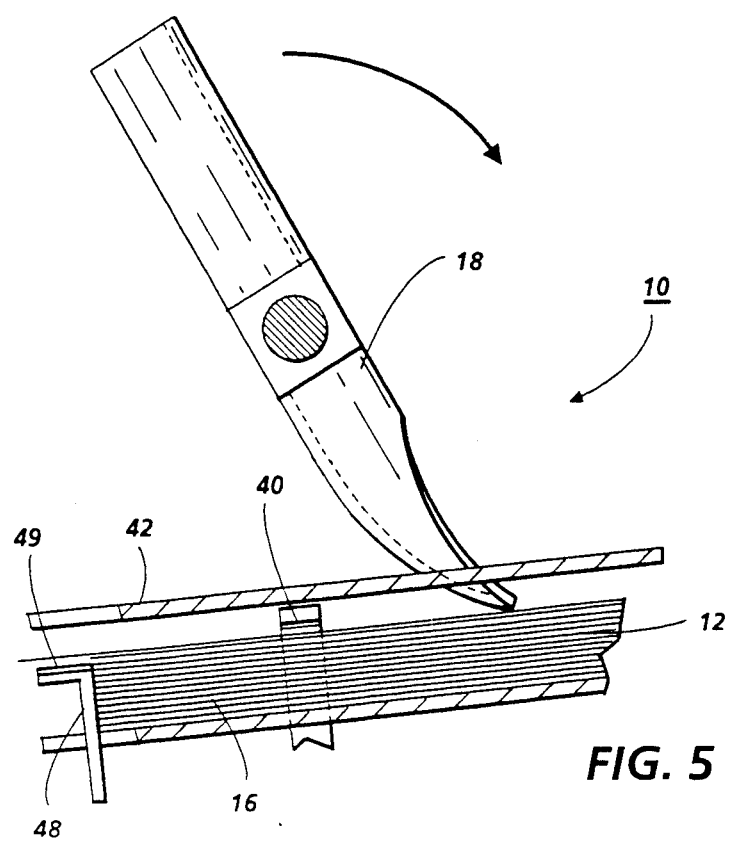

Describing now in further detail the specific example illustrated in the Figures, and the methods of operation usable therewith for improved, low cost, sheet feeding, there is illustrated an exemplary ADF 10 unit for sequentially feeding a stack of document sheets 12 to the platen 14 of a copier 16. It will be appreciated that the illustrated sheet feeder, or variations or modifications thereof, may also be utilized for feeding sheets from a stack of copy sheets in a copy sheet tray of a copier. FIGS. 2, 3 and 5 show the operating position for the initial feedout of the sheet being fed, and FIG. 1 shows the retard operating position, as explained herein. In FIG. 1 the front portion of the document stack is shown broken away for drawing clarity, and the stack is not shown in FIG. 3.

Figure 4:
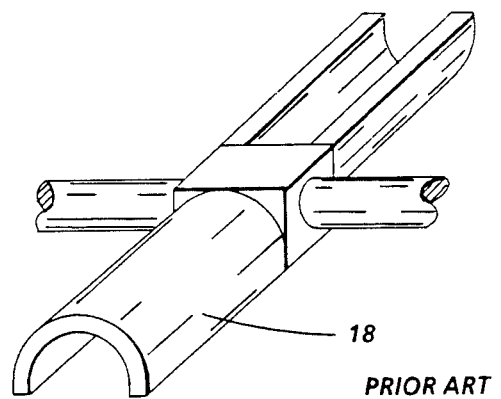
FIGS. 4 and 5 provide enlarged view of the feeder paddles of the sheet feeder of FIGS. 1-3, with FIG. 4 showing one paddle feeder per se and FIG. 5 illustrating a further enlarged side view of the initial feeding and separating area.

The details of the copier 16 need not be illustrated herein, since the present invention may be utilized with any copier; those illustrated and described in the patents cited herein, or any others. However, the system disclosed herein is particularly suitable for small or low cost copiers, because of its compact and low cost nature. The ADF unit 10 uses a paddle wheel feeding system 18 as described in the above introduction. That is, a feeder 18 with plural two-bladed paddles, as illustrated individually in detail in FIGS. 4 and 5, or the like, for frictional impact separating and feeding of the top sheet from the stack. The system herein is intended to provide a significant improvement in the feeding reliability, the prevention of double sheet feeds, and the range of weights and types of sheets which may be fed with this type of simple, low cost feeder. All the paddles or flappers are on a common fixed horizontal shaft driven by a motor 19.

With the system herein, the top of the stack of document sheets 12 is automatically moved towards, and maintained at the correct distance from, the paddle wheel feeder 18. An optimum or maximum feeding reliability distance is preset and maintained. It will be appreciated that alternativley, instead of moving the stack of sheets 12 up as described herein, the shaft of the feeder 18 may be moved down towards the stack, i.e., moved in the opposite direction, but otherwise utilizing the same basic mechanism and system disclosed herein.

In the ADF unit 10 here, the paddle wheel feeder 18 separates and initially feeds the topmost sheet out into take-away rollers 20. The latter may also provide the deskewing or side registration if desired. The take-away rollers 20 in turn feed the sheet on to second rollers 22 which carry it on toward the platen transport 24. The platen transport 24 conventionally feeds the document sheets onto the platen 14 for registration and copying by the copier 16.

The document sheets are conventionally stacked (loaded) in the stacking or input tray 26 of the ADF unit 10. Here, the tray 26 is pivotally mounted. The pivot point may be at its upstream end, but, as illustrated, is preferably intermediate the tray 26. That is, for load reduction on the tray drive motor, tray 26 preferably pivots about an intermediate position for partial counterbalancing of the stack load and the weight of the tray. The entire tray 26 and the stack of sheets thereon pivots around this pivotal mounting 28 to raise or lower the feed-out or downstream end of the tray 26 relative to the paddle wheel feeder 18. This movement is accomplished by a very simple, low cost mechanism. Here a small stepper motor 30 is utilized. The movement of the stepper motor and its actuation are controlled by the conventional copier controller 100 in preprogrammed modes of operation for step movements, as will be described. The stepper motor maybe of the small and inexpensive "hockey puck" type, which may be driven by conventional 50 or 60 cycle AC line current. It preferably includes a geared speed reducer 32 integral therewith, as is commercially available. The reducer 32 output in turn drives an integral cam roller 34 eccentrically. Thereby the cam roller 34 is driven by the rotational movement by the stepper motor 30 in an up or down movement by a predetermined movement distance corresponding to the number of applied motor steps or pulses. The maximum cam 34 movement corresponds to the maximum pivotal movement desired for the ADF tray 26. This cam roller (or pin) 34 engages a cam engagement surface 36 on the tray 26. Tray 26 may simply rest on the cam 34 at this surface 36 by gravity, and the position of the cam 34 at any given time thereby determines the vertical height or position of the downstream end of the tray 26 at that line. It will be appreciated that a servo motor may be used instead of a stepper motor, although more costly and not required in this system.

The stepper motor has an initial or loading position preprogrammed to lower the tray 26 all the way down to its lowermost position to optimize the loading of the stack therein, i.e., to allow a relatively thick stack to be inserted under the paddle wheel feeder 18 and under the stack stop 40.

Provided here is a very simple and low cost means for accomplishing the minimum, and initial operational spacing of the top of the stack 12 from the paddle feeder 18, i.e. the maximum interference of the paddles with the top of the stack. This is provided here preferably by a simple mechanical stacks top 40 extending out over a portion of the tray 26 at a position to engage the top or uppermost sheet of the stack 12 of sheets loaded thereon. Thus as the cam 34 drives the tray 26, and the stack 12 thereon, upwards toward the paddle wheel feeder 18, once the top of the stack, regardless of its thickness, reaches the under side of the stack stop 40, further upward movement is prevented. Rather than requiring an electrical switch, and its inherent positional inaccuracies the stepper motor 30 is allowed to stall momentarily at that point at which its further motion is prevented by the stack stop 40. This can be detected electrically, or, alternatively, the stepper motor 30 can be simply driven for a defined time period which is known to be greater than the time required to lift the tray 26 to its maximum elevation provided by the cam 34, knowing that stalling must occur before the end of that time period. Thus, the drive for the stepper motor 30 may simply be disconnected at the end of that initial time period, knowing that the top of the stack will be at its maximum or limited position at the end of that time period also.

After that initial stack stop or stalling point, the drive of the stepper motor 30 is then automatically reversed for a preset number of steps, i.e., a small preset distance. This lowers the top of the stack slightly away from the stack stop 40, i.e., slightly below the maximum or limit position. It is lowered by a preset distance into an optimum feeding position. That is, because the position of the stack stop 40 is fixed and known, and the radial extent or arc of the flappers on the paddle wheel feeder is likewise known (both being mounted to the same frame of the ADF). By dropping the top of the stack by a small known distance (a few counted stepper motor steps) the top of the stack is precisely located relative to the paddle wheel feeder 18 at a position which is predetermined to be the optimum feeding position. Furthermore, this preset optimum feeding position can be easily adjusted electrically, simply by changing the number of steps stored in the programmable microprocessor to be applied to the stepper motor 30 for this reverse movement from the limit position into the optimum feeding position. In fact, as an alternative, further discussed herein, this optimum feeding position can be determined automatically by feedback by noting the position (in step counts) at which a sheet is first fed as the stepper motor 30 is driving the top of the stack upwardly toward the limit position.

Note that the bottom of the stack stop 40 is mounted to be several millimeters above the lowermost circumference or arc of revolution of the paddle wheel feeder 18, to insure substantial interference and thereby insure adequate feeding engagement or flexing of the ends of the paddles against the top of the stack in the limit position provided by the bottom of the stack stop 40, and also for several millimeters below that position, in which range the optimum feeding position occurs.

As sheets are fed out by the ADF unit 10, the above-described process may be repeated to automatically reset the spacing of the flapper feeder from the stack at the optimum spacing for contact and feeding of the top sheet but without increasing the tendency to double feed the underlying sheet. Preferably, as each sheet is fed, its feed out is sensed and stepper motor 30 is reactuated to move up again. This separate movement may be all the way up to the stack stop 40, since that is only a very short distance from the feeding position, and then back down by the same (preset) step count as before to the optimum feeding position for the (now thinner) stack. Alternatively, the stepper is successfully fed.

There is another feature provided by the present system, also at low cost, and compactly, and integrally with the above system, which further resists and opposes double sheet feeding. This is provided here by further preprogrammed tray movement combined with front stack stops 48 with integral retard pads 49, as will be discussed later. Another feature provided here is a "funnel" guide 42 overlying the stack, which is preferably connected with, and moves with the moving ADF tray 26. This guide 42 may also be utilized to increase retard separation effects and thereby reduce the tendency to double feed, as will be further described herein. After the fed sheet is in rolls 20, tray 26 is retracted, carrying with it funnel guide 42. Funnel guide 42 pushes down on the fed sheet so that any second sheet below it is pressed against retard pads 49. This helps to prevent double sheet feeding.

As the sheets are fed out from the stack they are fed towards an optional nip guide 44 which helps direct the sheets into the nip of the takeaway rollers 20. The detection of the successful separation and initial feeding of a sheet is provided here by the exemplary take-away sensory 46. It may be located downstream of the nip of the take-away rollers 20, as illustrated, so as to insure that the sheet has been fully acquired by these rollers 20 by detecting the lead edge of the sheet exiting this nip.

It will be noted that these first take-away rollers 20 are tilted back relative to the plane of the tray 26, and therefore relative to the corresponding plane of the top of the stack 12. That is, the line between the two axes of the opposing rollers 20 forming this nip is at an acute angle relative to the initial plane of the sheet being fed out from the stack. This causes arcuate deformation or bending of the trail edge area of each sheet as that portion of each sheet is being fully removed from the stack 12 by these rollers 20. This, in turn, causes (through the normal beam strength of the sheet) a slight increase in the downward force of the sheet being fed out against the immediately underlying sheet of the stack near the lead edge of the stack. This is desirably utilized to increase separation, as will be described. Note that since this is an over-platen ADF, that only this initial portion of the sheet path here is extending upwardly away from the stack to provide this deformation, and that the subsequent sheet path includes the usual 180° inversion of the sheet back down to the platen 14. It will also be appreciated that if this were copy sheet feeding that the latter portion of this sheet path would not need such an inversion.

Take-away sensor 46 provides a signal indicative of (confirming that) a sheet has been fed out from the stack. The absence of a signal therefrom likewise indicates to the controller 100 that no sheet has been fed as of that point in time, as is conventionally practiced. This may be utilized for an alternative repositioning system based on the feedback of feeding success. That is, to set the optimum paddle feeder interference spacing based on sensed feeding. This alternative system would also start with the tray all the way down. Here also the stepper motor would step the stack up towards the feeder, but only until the top sheet is successfully fed, as sensed by the sensor 46. Instead of continuing on to the stack stop 40 position, the feed signal would immediately activate the reversal of the stepper motor to back the stack down slightly away from the feeder by a preset number of steps. (The stepper motor would not be stalled.) Just as in the previous system, once feeding is initiated, the steper motor 30 does ot step the stack back down to its lowest or loading position, nor step it all the way up again from that position. It merely steps the stack by a very slight distance to adjust for the stack feeding.

Thus, in either system the relatively slow and simple stepper motor repositioning system may be utilized, yet achieve rapidly sequential sheet feeding, because movement distances of only a millimeter or less are needed between fed sheets at the most.

The stepper motor 30 can be programmed to step back to the remembered step position at which the first successful sheet feed had occurred and this optimal position may be maintained by repeating this process after each sheet feed, or alternatively, after every second or third sheet feed.

Note the motor 19 for the paddle wheel feeder 18 may be a simple low power AC motor, turned on and off by the controller 100 at appropriate time periods. It is, for example, inactivated during the initial loading of the stack and during the initial raising of the stack into the limit position in the mode of operation herein utilizing a stack stop position. A shaft detent or other known means may be provided to stop the blades in a horizontal position. However, even if a paddle stopped on top of the stack, it would be pulled away by the removal of the top sheet.

Turning now to the dual mode plural fixed front stop fingers 48 mounted to the ADF unit 10, these fingers 48 extend by a preset fixed distance above the lowermost position of the tray 26. (It will be noted that only the tray 26 and the upper or "funnel" guide 42 are moved by the stepper motor 30.) Apertures or notches in the front edge of the tray 26 are provided so that the tray can move relative to these fingers 48 without interference, and so that as the tray 26 is lowered the fingers 48 can extend up through these apertures, above the level of the tray 26. Corresponding such notches or apertures may also be provided in the funnel guide 42. Thus, in the lowermost or loading position of the tray 26 and the guide 42, all of the documents to be loaded may be guided in between the guide 42 and the tray 26 into abutment with these front stack stops 48. That is, the fingers 48 fully extend between the tray 26 and the guide 42 in this loading position to provide a complete stop for set insertion, preventing any accidental pushing of the upper sheet of the stacks beyond the fingers 48, and determining the forward feeding position of the stack 12 relative to the paddle wheel feeder 18.

These fingers 48 are downstream of the stack interference or engagement area of the paddle wheel feeder 18 and downstream of the stack top stop 40. The top of the front stop 48 is also below the level of the stack top stop 40, as will be further explained.

The tops of the front stop fingers 48 comprise frictional material providing sheet retard pads 49. These are utilized in conjunction with cyclic movement of the tray 26 by the stepper motor 30 for increased retard effect. Specifically, each time a (top) sheet has been fed out by the paddle wheel feeder 18, the tray 26 is lowered by a preset distance to lower the top of the stack to the level of, or preferably slightly below the level, of the retard pads 49 so that any tendency of the next or underlying sheet to "double feed" out with the prior sheet is resisted by engagement of the second sheet by the retard pads 49. Yet, preferably the normal position of the retard pads 49 is substantially below the level of the optimum sheet feeding position established by the controller 100. Thus, during the initial feeding of a sheet by the fingers of the paddle wheel feeder 18, the retard pads 49 are below the top of the stack and do not engage or interfere with the lead edge portion of the sheet being fed out. Only after the lead edge portion of that sheet is fed out, and preferably already acquired by the take-away rollers 20, is the tray then lowered by the stepper motor 30 by the additional small distance required to lower the top of the stack below the level of the retard pads 49, temporarily, before the next sheet is fed.

The above-described deflection of the copy sheet being fed out increases the normal force of that sheet on the next underlying sheet and therefore the normal force of the underlying sheet against the retard pads 49, thereby increasing the resistance to double feeding.

Once the top sheet has been fed out, and it is desired to feed the next sheet, the stepper motor is immediately reactivated to feed the tray upwards again and into the optimum feeding position for the top of the stack, i.e., up away from the effect of the retard pads 49, so that they cannot interfere with or resist the initial lead edge feedout by the frictional impact feeder 18.

To summarize the operational description, the tray 26 is loaded in a lowered loading position. On the command to feed the first document or copy sheet, the stack is elevated by the stepper motor 30 until the topmost sheet (sheet 1) is squeezed against the stack stop 40, or, in the alternative system, until this first sheet is partially fed out. If the stack is stopped by the stop 40, the stepper motor simply stalls momentarily (no switch is required) and then is reversed for a prescribed number of steps. This sets the optimum feeder interference and assures that there is no initial drag from the stack stop 40 or the retard pads 49. The top sheet is fed by a series of half-turns of the paddle unit 18 until it is acquired by the take-away rollers 20. At this point the drive 19 of the paddle wheel feeder 18 may be stopped and the stack is elevated down by the stepper motor 30 by another predetermined increment into the retard position. With the assistance of the take-away rollers being oriented so that the tail of the fed sheet is biased downwardly, the high friction retard material 49 on the tops of the fingers 48 now drags against the bottom of the fed sheet and will retard a second sheet from being shingle-fed along with the first sheet into the take-away rollers 20.

As soon as the tail edge of the first sheet exits the tray 26, (calculated by either timing or sensing) this above cycle can be repeated for the next sheet feed. Alternatively, this system can cycle between a nonfeeding position and a position in which feeding is achieved, utilizing the feeding success feedback system previously described. When no more sheets can be fed, which may be sensed by a time delay from the last attempted feed, the tray can be automatically lowered back down to its initial or reloading position.

The top of the stack level is cyclically repositioned in each feeding cycle relative to a fixed retard pad position, and that initial feeding and retarding occur at significantly different positions of the stack, functionally, although the actual physical, distance of this cyclic movement may be only one or two millimeters or less.

Since the ADF unit 10 can provide an elongate array of multiple (parallel) paddle wheel feeders 18 on a common shaft at low cost, and a similarly elongated array of retards, the ADF tray 26 can be made large enough to accommodate small or large document sheets fed in either direction or orientation, i.e., either portrait (short-edge-first) or landscape (long-edge-first), without inducing skew because there are not off-center feeding or retard forces.

During normal operation, the feeding cycle up and down movement from the stepper motor 30 need only be approximately 1 millimeter, which can be divided into, e.g., 16 steps of the stepper motor which, at 1/60th of a second per step would require only 0.27 seconds. That could feed 60 sheets per minute with only a simple 60 cycle, 60 pulses per minute, stepper motor.

The control of all sheet feeding is, conventionally, by the copier's controller 100. The controller 100 is preferably a known programmable microprocessor, exemplified by the previously cited art. The controller 100 conventionally controls all of the machine steps and functions described herein including all operations of the document feeder, document and copy sheet gates, the feeder drives, etc.. As further taught in those references, the controller 100 also conventionally provides for storage and comparison of the counts of the copy sheets, the number of documents fed, the desired number of copy sets and other selections by the operator made through the panel of switches thereon, time delays, jam correction control, etc..

It may be seen that the system disclosed herein provides the precision positioning requisite for a highly reliable paddle wheel document handler, yet without the high cost associated with other reliable document feeders, and also providing, as an additional but integral feature, a simple, low force, but effective, retard system for preventing multiple sheet feeds. The combination of optimized flapper tip interference, continuously reset interference to an optimized feeding position, and non-interfering but effective second sheet retard therewith, provides improved sequential single sheet feeding, with enhanced reliability and performance, yet this is provided here with a low cost and lightweight structure with very few moving parts.

While the embodiments disclosed herein are preferred, it will be appreciated from this teaching that various alternatives, modifications, variations or improvements therein may be made by those skilled in the art, which are intended to be encompassed by the following claims:

What is claimed is:

1. In a sheet feeder for a copier for the sequential separation and feeding of individual sheets sequentially from a stack of sheets on a sheet stacking tray by means of an impact type sheet feeder in which the sheet on the top of the stack to be fed is repeatedly impacted by overlying driven flexible frictional flapper blades which engage and flex against the top sheet during impact therewith and feed the top sheet forward away from the stack; the improvement comprising:

repositioning means for automatically moving, towards or away from one another, one end of said sheet stacking tray with the stack of sheets thereon relative to said impact sheet feeder;

reference stop means for automatically limiting said movement of said sheet stacking tray towards said impact sheet feeder by said stack repositioning means to an initial stopping position of the top of the stack relative to said impact sheet feeder;

said reference stop means comprising a fixed mechanical stop positioned to engage the top of the stack and physically prevent the movement of the top of said stack by said repositioning means any closer to said impact sheet feeder than said initial stopping position;

said stack repositioning means further including automatic reset means for automatically moving the stack in the opposite direction, away from said impact sheet feeder, and out of engagement with said reference stop means, by a small controlled movement distance into an optimum feeding position corresponding to a desired, preset amount of said engagement of said flexible frictional flapper blades against the top sheet of the stack, after said initial stopping position has been set by said reference stop means;

sheet feeding sensor means for detecting and providing signals as to whether a sheet has been successfully fed from said stack by said impact sheet feeder;

said stack repositioning means including means for automatically repeating said movement of the stack relative to said impact sheet feeder in response to said signals from said sheet feeding sensor means to reset said optimum feeding position in response to whether or not said impact sheet feeder is feeding sheets from the stack or to compensate for the reduction in the height of the stack as sheets are fed therefrom.

2. The sheet feeder of claim 1 wherein said means for automatically repeating said movement of the stack relative to said impact sheet feeder with said stack repositioning means is actuated each time the feeding of a sheet is signaled by said sheet feeding sensor means, to automatically reset said optimum feeding position after each sheet feed.

3. The sheet feeder of claim 1 wherein each time said stack repositioning means is actuated it cycles through a movement into said initial stopping position and then a reverse movement into said optimum feeding position, during which said impact type sheet feeder is not actuated.

4. The sheet feeder of claim 2 wherein each time said stack repositioning means is actuated by the feeding of a sheet signaled by said sheet feeding sensor means it cycles through a variable movement driving said sheet stacking tray up into said initial stopping position determined by said engagement of said fixed mechanical stop with the top of the stack, and then a fixed distance reverse movement down into said optimum feeding position, and said impact type sheet feeder is not actuated until after said optimum feeding position is reached.

5. The sheet feeder of claim 1 wherein said stack repositioning means comprises a stepper motor drive and a programmable control means having a preprogrammed drive of said stepper motor.

6. The sheet feeder of claim 2 wherein said stack repositioning means, including said automatic reset means and said means for automatically repeating said movement of the stack, comprises a stepper motor drive and a programmable control means with programmed drive of said stepper motor in response to said sheet feeding sensor means.

7. The sheet feeder of claim 1 wherein said stack repositioning means comprises a stepper motor drive, which is stallable by said engagement of said fixed mechanical stop with the top of the stack, and a programmable control means providing a programmed forward drive of said stepper motor until said stall is reached and then a reverse drive of said stepper motor by a small preset number of steps of said stepper motor in reponse to said stalling of said stepper motor to provide said automatic reset means.

8. The sheet feeder of claim 1 wherein, while said stack repositioning means is initially actuated to move the top of the stack towards said initial stopping position, said impact type sheet feeder is also actuated, and if and when the feeding of a sheet thereby is signaled by said sheet feeding sensor means during said initial movement, said stack repositioning means is automatically reversed before reaching said initial stopping position and driven by a small preset reverse movement distance to set said optimum feeding position.

9. The sheet feeder of claim 8 wherein said initial movement towards said initial stopping position is reactuated automatically in response to the non-feeding of a sheet signaled by said sheet feeding sensor means after a predetermined time period.

10. The sheet feeder of claim 8 wherein said means for automatically repeating said movement of the stack relative to said impact sheet feeder with said stack repositoning means towards said initial stopping position is actutated each time the feeding of a sheet is signaled by said sheet feeding sensor means, to automatically reset said optimum feeding position after each sheet feed.

11. The sheet feeder of claim 1 wherein said reference stop means automatically limits said movement of said sheet stacking tray towards said impact sheet feeder by said stack repositioning means to a maximum limit position of the top of the stack relative to said impact sheet feeder, and said stack repositioning means automatic reset means automatically repositions said sheet stacking tray with the stack of sheets thereon to maintain said optimum feeding position, in which optimum feeding position the top of the stack of sheets is maintained at a substantially constant level position relative to said impact sheet feeder which is closely adjacent said maximum limit position of the top of the stack, and said stack repositioning means automatically repositions said sheet stacking tray to maintain said optimum feeding position of the top of the stack to compensate for the reduction in the height of the stack as sheets are fed therefrom.

12. The sheet feeder of claim 1 wherein said stack repositioning means comprises a stepper motor drive and a programmable control means having a preprogrammed drive of said stepper motor.

13. The sheet feeder of claim 12 wherein said preprogrammed drive of said stepper motor includes a stack repositioning programmed drive actuated in response to said sheet feeding sensor means.

14. The sheet feeder of claim 12 wherein said preprogrammed drive of said stepper motor includes a stack repositioning programmed drive actuated in response to said reference stop means.

15. In a sheet feeder for a copier for the sequential separation and feeding of individual sheets sequentially from a stack of sheets in a sheet stacking tray by means of an impact type sheet feeder in which the top sheet of the stack to be fed is repeatedly impacted by overlying driven flexible frictional flapper blades adjacent a downstream end of the stack, which frictional flapper blades flex against the top sheet of the stack during impact therewith and feed the top sheet forward away from the downstream end of the stack; the improvement comprising:

repositioning means comprising preprogrammed drive means for automatically moving said sheet stacking tray with the stack of sheets thereon and said impact sheet feeder towards or away from one another;

reference stop means for automatically limiting said movement of said sheet stacking tray towards said impact sheet feeder by said stack repositioning means to a maximum limit position of the top of the stack relative to said impact sheet feeder;

said stack repositioning means having a first programmed positioning mode for automatically repositioning said sheet stacking tray with the stack of sheets thereon into said maximum limit position of the top of the stack;

said stack repositioning means having a second programmed positioning mode for automatically slightly lowering said sheet stacking tray with the stack of sheets thereon into an optimum feeding position, in which optimum feeding position the top of the stack of sheets is maintained at a substantially constant level position relative to said impact sheet feeder, which optimum feeding position is closely adjacent, but slightly spaced below, said maximum limit position of the top of the stack;

and said stack repositioning means having an optimum feeding positioning mode for automatically repositioning said sheet stacking tray as sheets are fed from the stack to maintain said optimum feeding position of the top of the stack and to automatically compensate for the reduction in the height of the stack as sheets are fed therefrom by cycling said sheet stacking tray with said stack repositioning means though small up and then down movements coordinated with the feeding of sheets from the stack.

* * * * *